United States Patent [19]
Hartmann et al.

[11] 3,894,943
[45] July 15, 1975

[54] METHOD AND APPARATUS OF ACCELERATING THE SEPARATION OF LIQUID DISPERSIONS

[75] Inventors: Rainer Hartmann; Otto Kunz, both of Frankfurt am Main, Germany

[73] Assignee: Metallgesellschaft Aktiengesellschaft, Frankfurt am Main, Germany

[22] Filed: Dec. 21, 1972

[21] Appl. No.: 317,443

[30] Foreign Application Priority Data
Dec. 24, 1971 Germany............................ 2164476

[52] U.S. Cl. ................... 210/23; 210/299; 210/307
[51] Int. Cl. ........................................... B01d 13/00
[58] Field of Search ....... 210/23, 83, 456, 521, 522, 210/535, 249, 307, 317, 489, DIG. 5

[56] References Cited
UNITED STATES PATENTS

| | | |
|---|---|---|
| 651,294 | 6/1900 | Burger et al.................. 210/536 X |
| 2,214,248 | 9/1940 | Hawley................... 210/51 |
| 2,609,099 | 9/1952 | Griswold........................ 210/54 |
| 2,731,150 | 1/1956 | McCann...................... 210/43 |
| 3,297,161 | 1/1967 | Kasten................................ 210/114 |
| 3,385,439 | 5/1968 | Bach............................ 210/522 X |
| 3,417,015 | 12/1968 | Canevari et al................. 210/307 X |

Primary Examiner—Frank A. Spear, Jr.
Attorney, Agent, or Firm—Burgess, Dinklage & Sprung

[57] ABSTRACT

The separation of liquid dispersions in a gravitational field is accelerated by introducing the dispersion into a packed separating zone having a plurality of layers extending in the direction of flow and at right angles to the gravitational field. The separating zone can be preceded by a distribution zone which promotes distribution of the entering dispersion among the packing layers.

9 Claims, 6 Drawing Figures

METHOD AND APPARATUS OF ACCELERATING THE SEPARATION OF LIQUID DISPERSIONS

BACKGROUND

This invention relates to a method for accelerating the separation of liquid dispersions consisting of two or more mutually insoluble or only partly soluble liquids into the separate liquid phases in a natural or artificial gravitational field in which method the dispersion to be separated is introduced into a packed separating vessel, from which the separated phases are withdrawn, and to apparatus for carrying out the method.

Such liquid dispersions may be formed, e.g., during a separation of substances by liquid-liquid extraction in the mixing units of the extraction systems. In this case, one of the phases, called the dispersed phase, is distributed in the form of fine droplets in the other phase, which is called the continuous phase. After an adequate residence time, such mixtures of mutually insoluble liquids in most cases separates spontaneously into its separate phases.

That residence time will determine the dimensions of a separator to be used for the separation of a liquid dispersion at a predetermined throughput rate.

The performance of a separator can be defined by the throughput rate per unit of area, expressed in cubic meters of liquid mixture per hour for a given bottom surface area of the separator in square meters. The required residence time will depend on the viscosity of the continuous phase (determined by data relating to the materials), on the difference between the densities of the two phases, on the interfacial tension and significantly on the size of the droplets of the dispersed phase. The size of the droplets will determine the settling velocity of the liquid droplets and the time required to move all droplets of the dispersed phase out of the continuous phase by gravity, centrifugal force or other fields of force and to collect said droplets in a separate continuous phase. The settling velocity will increase with the diameter of the droplets of the dispersed liquid.

This fact has been utilized in known methods in which the droplets have been increased in size in order to increase the throughput rate of a separator. It is known, for instance, to provide the phase separator with a metallic packing, which fill the phase separator but does not substantially reduce the free cross-section thereof. Such packing consists of bodies which have sharp edges in a length of 10–25 centimeters per square centimeter of their surface area and which have in one direction a dimension which is at least three times any of their dimensions in the other directions (German Patent No. 1,442,444).

SUMMARY

It is an object of the present invention to accelerate the separation of liquid dispersions consisting of two or more mutually insoluble or only partly soluble liquids into separate liquid phases in a natural or artificial gravitational field in which method the dispersion to be separated is introduced into a packed separating container, from which the separate phases are withdrawn.

This object is accomplished according to the invention by dividing the packing into a plurality of layers which extend parallel to the direction of flow of the dispersion to be separated and at right angles to the direction of the gravitational field.

DESCRIPTION OF THE DRAWING

The invention will be described more fully and by way of examples with reference to the diagrammatic drawings and in the Examples.

DESCRIPTION

Figure 1:
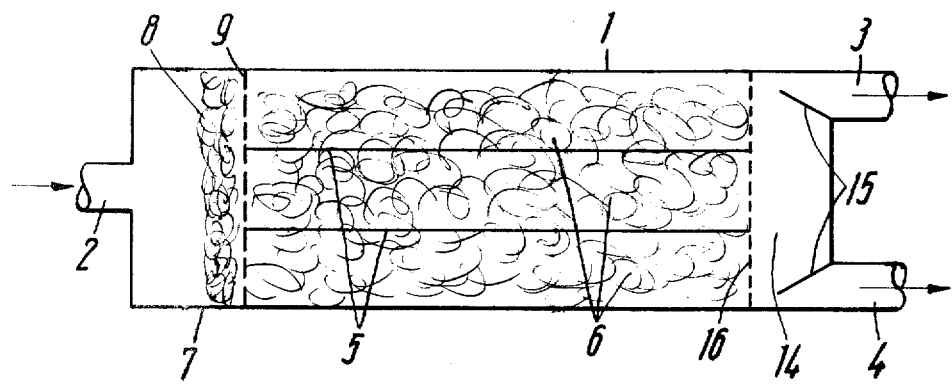
FIG. 1 is a diagrammatic longitudinal sectional view showing an apparatus which may be used to carry out the method according to the invention.
Figure 2:
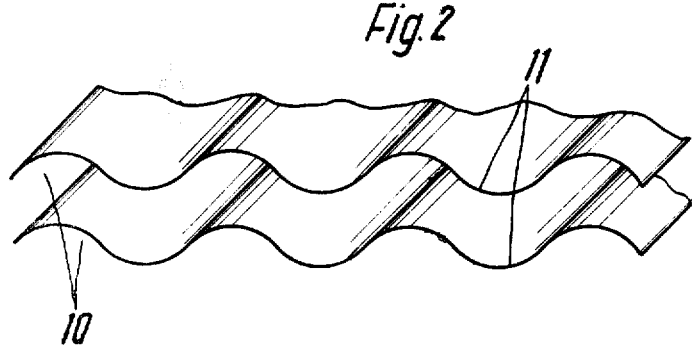
FIG. 2 shows corrugated plates for dividing the packing into a plurality of layers.
Figure 3:
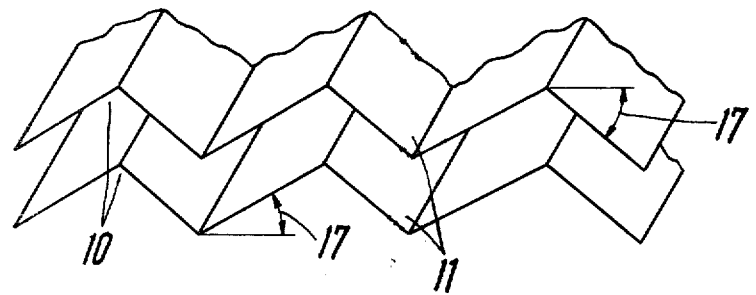
FIG. 3 shows zigzag-shaped plates for dividing the packing into a plurality of layers.
Figure 4:
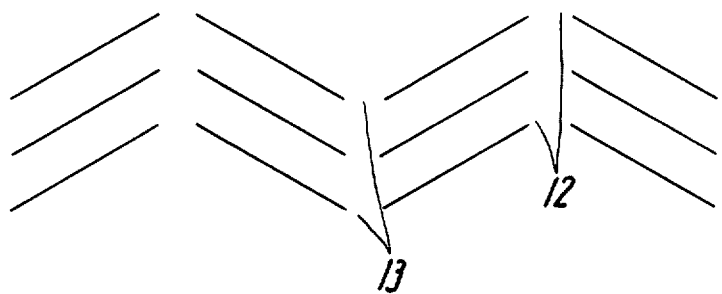
FIG. 4 shows zigzag-shaped plates having outlets for the separated liquids.

By the division of the packing into several layers, the throughput rate of a separator can be increased to a multiple of the throughput rate of a separator having an undivided packing.

It will be particularly desirable if the packing is preceded by a distributor 7, which results in an improved and more uniform distribution of the liquid dispersion entering the phase separator among the layers 6 of the packing. This feature will result in a substantial increase of the maximum throughput rate per unit of area, particularly in separators having a circular bottom surface.

A particularly fast separation of the liquid dispersion will be obtained if the liquid mixture is caused to flow through a packing which is divided into a plurality of layers 6 and consists of a material which is preferentially wetted by the dispersed phase.

The packing divided into a plurality of layers 6 may also consist of a plurality of materials.

When it is desired to separate emulsionlike dispersions e.g., of mono- or polyunsaturated hydrocarbon fractions and a mixture of N-methyl-pyrrolidone and water, the throughput rate can be much improved if the first portion of the packing consists in each layer of metallic turnings and the following portion consists of polyolefine filaments or fibers, e.g., of polyethylene or propylene, which are preferably 0.2–1.5 millimeters in diameter.

Wood wool, for instance, may be used instead of the metallic turnings.

Partitions 5 are used to divide the packing into a plurality of layers 6 and extend parallel to the direction of flow of the dispersion to be separated.

The distributor 7 insuring an improved and more uniform distribution of the dispersion to be separated among the individual layers 6 consists preferably of a packing 8 which in the direction of flow of the dispersion to be separated is succeeded by a perforated plate 9.

The material of the packing 8 of the distributor 7 may consist of the same material as the packing which is divided into the layers 6.

The apparatus for carrying out the method according to the invention comprises a separating vessel which contains the packing and is provided with an inlet for the liquid dispersion to be separated and with outlets for the separated phases.

The apparatus is characterized in that the package is divided into a plurality of layers 6 by partitions 5.

Another feature of the apparatus according to the invention resides in that the layers 6 are preceded by a distributor 7, which consists of a packing 8 and a perforated plate 9.

It has been found particularly suitable to use partitions 5 which consist of corrugated or zigzag-shaped plates having crests 10 and valleys 11 which are, respectively, vertically aligned and extend in the direction of flow of the liquid, which plates are provided in the crests 10 and valleys 11 with outlets 12 and 13 for the separated phases.

Figure 6:
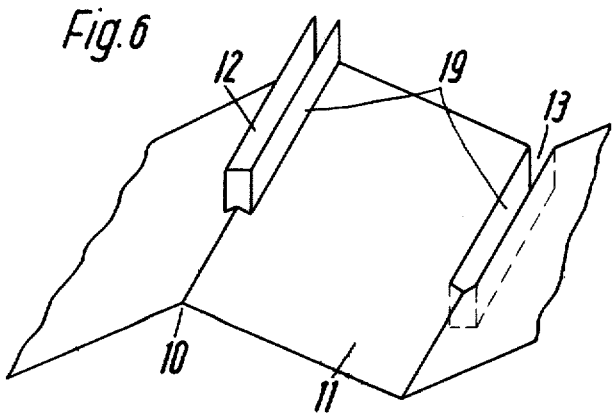
FIG. 6 shows slot-like outlets in a crest and in a valley of zigzag-shaped plates.

In the first one-third, seen in the direction of flow, the plates have preferably no outlets 12 and 13. (FIG. 6)

The drawings show a separating vessel 1 for separating the liquid mixture, an inlet 2 for the liquid mixture to be separated, an outlet 3 for the separated lighter phase, an outlet 4 for the separated heavier phase, a sheet metal partition 5, which divides the packing into layers, layers 6 of the divided packing, a distributor 7 for uniformly distributing the liquid mixture among the packing layers, a packing 8 of the distributor, a perforated plate 9 of the distributor, crests 10 in the sheet metal partition plates, valleys 11 in the sheet metal partition plates, outlets 12 in the crests 10 for lighter liquid which has been separated, outlets 13 in the valleys 11 for separated heavier liquid, a collecting zone 14 for the separated liquid, a weir 15 preceding the outlets 3 and 4 for the separated liquids, a wire screen 16 which retains the packing, an angle of inclination 17 of zigzag-shaped plates, the length 18 of the packing and a slot-like outlet 19 in plates 6 along crests 10 and valleys 11 for separated liquid.

EXAMPLE 1

Figure 5:
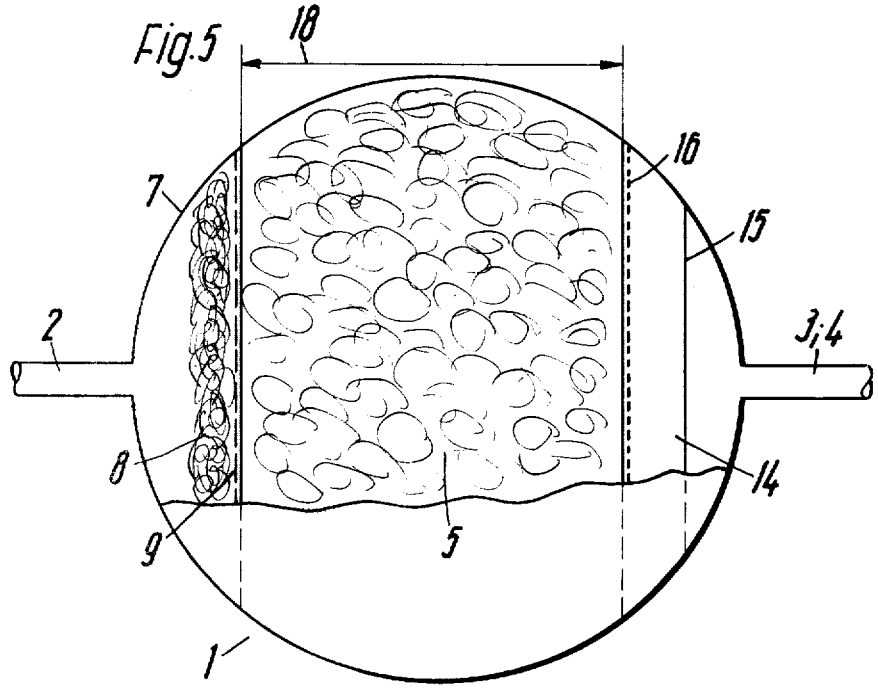
FIG. 5 is a top plan view showing a separating chamber having a round bottom.

To carry out the method, a mixture which has been dispersed in a mixer, not shown, is charged through an inlet 2 into a cylindrical separating vessel 1 (FIG. 5). Forty per cent by volume of the mixture consist of a solvent (N-methyl pyrrolidone containing 11% by weight of water), which is saturated with hydrocarbons, and 60% by volume consist of a solution of toluene and nonaromatic hydrocarbons. The mixture has a specific gravity of 0.811 kilograms per cubic decimeter.

The separating vessel 1 has a height of 80 centimeters and is 200 centimeters in diameter.

The separating vessel 1 contains a packing, which consists of metallic turnings of Cr-Ni stainless steel, which is preferentially wetted by the heavy phase. This packing is divided by three plane partitions 5 into four horizontal layers 6.

The packing is retained by a wire screen 16 so that the packing is not forced by the flowing liquid out of the partitions which confine the several layers. The packing has a length 18 of 140 centimeters. The dispersion enters the separating vessel 1 through the inlet 2 and by a distributor 7 is uniformly distributed among all four packing layers 6 and throughout the receiving cross-section of flow.

The distributor 7 comprises a wood wool packing 8, which has a thickness of 10 centimeters, and a perforated sheet metal element 9 having openings which are 1.5 centimeters in diameter and having a spacing of 3 centimeters. The packing and the perforated sheet metal element 9 extend along a chord at right angles to the direction of flow and throughout the height of the separating vessel.

The mixture is separated in each layer 6 of the packing into an N-methyl pyrrolidone liquid phase and a hydrocarbon liquid phase. The separated phases are collected in the collecting chamber 14 and are separately withdrawn through the outlets 3 and 4.

With the arrangement described, the separating vessel was operated at a throughout rate up to 30.1 cubic meters of the mixture per hour per square meter.

When the same mixture was treated in the described separating chamber containing the described packing of turnings of stainless steel which packing was not divided according to the invention into a plurality of layers, a throughput rate of only 13.8 cubic meters per hour per square meter was reached.

EXAMPLE 2

The same separating vessel as in Example 1 is used to carry out the method, using the same mixture as in Example 1.

The same packing as in Example 1 is arranged in the interior of the separating vessel.

The packing is divided into four horizontal layers 6 by three partitions 5, which consist of zigzag-shaped plates having crests 10 and valleys 11 which are, respectively, vertically aligned and extend in the direction of flow of the liquid and are provided with outlets 12 for the separated lighter hydrocarbon phase and with outlets 13 for the heavier N-methylpyrrolidone-water phase. The angle of inclination 17 of the plate amounts to 10° and the distance between the crests 10 and valleys 11 is 50 centimeters.

The outlets 12 and 13 are slot-like and have a width of 2 centimeters, a height of about 3.7 centimeters, and a length of 70 centimeters and are spaced 70 centimeters apart from the perforated sheet metal element 9.

The distributor 7 is designed as in Example 1.

With this arrangement, the separating vessel was operated with a throughput rate up to 35 cubic meters per hour per square meter.

EXAMPLE 3

The arrangement used to carry out the method is the same as that used in Example 2, except for the packing.

The packing consists in the first portion of the separating chamber 1, to a depth of 55 centimeters from the liquid distributor 7, of turnings of Cr-Ni stainless steel. The remaining portion, having a depth of 85 centimeters, of the packing having a total depth of 140 centimeters consists of irregular polypropylene fibers which are about 0.2–1.5 millimeters in diameter and arranged so that the fiber axes are preferentially vertical and the fiber volume does not exceed about 10% of the free volume of the space which is filled by the fibers.

The sheet metal partitions are designed as in Example 2.

With this arrangement, the separating vessel can be operated at a throughput rate up to 41 cubic meters per hour per square meter.

EXAMPLE 4

The arrangement and the mixture which are used are the same as in Example 3. In addition, the collecting chamber 14 is filled with the polypropylene fibers described in Example 3.

In this case, the separating vessel was operated at a throughput rate up to 49 cubic meters per hour per square meter.

The advantages afforded by the invention reside particularly in that the separation of a liquid dispersion of two liquids which are mutually insoluble or only partly soluble into the individual liquid phases, is much accelerated.

Because the packing of the separating vessel is divided according to the invention into a plurality of layers, which extend parallel to the direction of flow of the dispersion to be separated and at right angles to the direction of the gravitational field, the rate of separation of the separator is increased several times for a given space requirement of the separator so that the economy is improved.

The invention affords also the advantage that an existing separating chamber may be modified in that the packing is divided into a plurality of layers which extend parallel to the direction of flow of the dispersion to be separated so that the capacity can be increased without need to install an expensive, additional separating chamber or a correspondingly larger, new separating chamber.

It is surprising that the separation will be particularly promoted if the packing in the separating vessel consists of a material which is preferentially wetted by the dispersed phase. Depending on the composition of the liquid mixture to be separated, the packing may consist of two different materials. For instance, for the separation of a dispersion of aqueous N-methyl pyrrolidone in a hydrocarbon mixture, e.g., a mixture of toluene and non-aromatic hydrocarbons, it has been found satisfactory to use a packing which in the preceding portion of the separating vessel consists of turnings of stainless steel or of wood wool, and in the succeeding portion consists of polyolefin filaments or polyolefin fibers, e.g., of polyethylene or polypropylene filaments.

What is claimed is:

1. Apparatus for accelerating the separation of liquid dispersions, comprising a separating vessel having an inlet for the liquid dispersion to be separated, outlets for the separated phases, the interior of said separating vessel having a plurality of spaced apart parallel partition means extending in the direction of flow and at right angles to the gravitational field and a plurality of layers of packing material filling the space between said partition means, said partition means being corrugated or zigzag-shaped plates, having crests and valleys, said plates being vertically aligned and extending in the direction of flow.

2. Apparatus of claim 1 wherein the partition means are preceded by distributor means including a packing and a perforated plate.

3. Apparatus of claim 1 wherein said plates have outlets for the separated phases in their crests and valleys.

4. Apparatus of claim 3 wherein the first one-third of said plates in the direction of flow have no outlets.

5. Method for accelerating the separation of liquid dispersions of aqueous N-methyl pyrrolidone in a hydrocarbon mixture into the separate liquid phases in a natural or artificial gravitational field which comprises introducing the dispersion to be separated into a packed separating zone having a plurality of spaced apart parallel partitions extending in the direction of flow of the dispersion to be separated and at right angles to the direction of the gravitational field and a plurality of layers of packing material consisting of stainless steel turnings filling the space between said partitions, and withdrawing the separated phases from said separating zone.

6. Method of claim 5 wherein the separating zone is preceded by a distribution zone which promotes an improved and more uniform distribution of the liquid dispersion entering the layers of the packing material.

7. Method of claim 6 wherein the distribution zone comprises a packing and a perforated plate.

8. Method of claim 7 wherein the distribution zone packing material consists of stainless steel turnings.

9. Method of claim 5 wherein the first portion of packing material in each layer consists of stainless steel turnings and the following portion is a polyolefine filaments or fibers.

* * * * *